United States Patent
Kim et al.

(10) Patent No.: US 9,344,836 B2
(45) Date of Patent: May 17, 2016

(54) METHOD AND APPARATUS FOR TRIGGERING MTC GROUP IN WIRELESS COMMUNICATION SYSTEM

(71) Applicant: LG Electronics Inc., Seoul (KR)

(72) Inventors: Laeyoung Kim, Anyang-si (KR); Jaehyun Kim, Anyang-si (KR); Taehyeon Kim, Anyang-si (KR); Hyunsook Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/382,735

(22) PCT Filed: Mar. 20, 2013

(86) PCT No.: PCT/KR2013/002292
§ 371 (c)(1),
(2) Date: Sep. 3, 2014

(87) PCT Pub. No.: WO2013/141599
PCT Pub. Date: Sep. 26, 2013

(65) Prior Publication Data
US 2015/0050955 A1    Feb. 19, 2015

Related U.S. Application Data

(60) Provisional application No. 61/613,466, filed on Mar. 20, 2012, provisional application No. 61/661,358, filed on Jun. 19, 2012, provisional application No. 61/705,153, filed on Sep. 25, 2012.

(51) Int. Cl.
*H04W 4/00* (2009.01)
*H04W 28/02* (2009.01)
*H04W 4/08* (2009.01)

(52) U.S. Cl.
CPC ............... *H04W 4/005* (2013.01); *H04W 4/08* (2013.01); *H04W 28/0215* (2013.01)

(58) Field of Classification Search
CPC .................... H04W 4/005; H04W 28/0215
USPC ........... 455/518, 519, 452.1, 509, 452.2, 517, 455/515, 510
See application file for complete search history.

(56) References Cited

U.S. PATENT DOCUMENTS

| | | | |
|---|---|---|---|
| 9,049,685 B2 * | 6/2015 | Starsinic | H04W 4/001 |
| 9,125,003 B2 * | 9/2015 | Ma | H04W 4/005 |
| 2012/0004003 A1 | 1/2012 | Haheen et al. | |
| 2014/0369326 A1 * | 12/2014 | Wang | H04W 4/005 370/336 |

FOREIGN PATENT DOCUMENTS

| | | |
|---|---|---|
| EP | 2369883 | 6/2010 |
| KR | 1020110082486 | 7/2011 |
| WO | 2011098150 | 8/2011 |

OTHER PUBLICATIONS

LG Electronics Inc., "Group paging for MTC devices", R2-104004, 3GPP TSG-RAN 2 Meeting #70bis Stockholm, Sweden, Jun. 28-Jul. 2, 2010, see p. 2.

* cited by examiner

*Primary Examiner* — John J Lee
(74) *Attorney, Agent, or Firm* — Dentons US LLP

(57) ABSTRACT

A method for enabling a Machine Type Communication (MTC)-InterWorking Function (IWF) to trigger a MTC group in a wireless communication system according to one embodiment of the present invention comprises a step of transmitting a triggering request to a network node. The network node for receiving the triggering request determines success of the triggering request according to group-triggering-related information comprising information on whether the triggering request is transmitted in MTC group units.

13 Claims, 9 Drawing Sheets

METHOD AND APPARATUS FOR TRIGGERING MTC GROUP IN WIRELESS COMMUNICATION SYSTEM

This application is a 35 USC §371 National Stage entry of International Application No. PCT/KR2013/002292 filed on Mar. 20, 2013, and claims priority to U.S. Provisional Application Nos. 61/613,466 filed on Mar. 20, 2012; 61/661,358 filed on Jun. 19, 2012 and 61/705,153 filed on Sep. 25, 2012, all of which are hereby incorporated by reference in their entireties as if fully set forth herein.

TECHNICAL FIELD

The present invention relates to a wireless communication system and, more particularly, to a method and apparatus for performing and supporting Machine Type Communication (MTC) group triggering.

BACKGROUND ART

Machine Type Communication (MTC) refers to a communication scheme using one or more machines, and may also be referred to as Machine-to-Machine (M2M) communication. Here, a machine may be an entity that does not require direct manipulation or intervention of a user. For example, not only a device, e.g., a meter or a vending machine, including a mobile communication module but also a User Equipment (UE), e.g., a smartphone, capable of automatically accessing a network without user manipulation or intervention to perform communication may be machines. These machines are referred to as MTC devices or UEs in the present specification. That is, MTC refers to communication performed by one or more machines (i.e., MTC devices) without user manipulation or intervention.

MTC may include communication between MTC devices (e.g., Device-to-Device (D2D) communication) and communication between an MTC device and an MTC application server. Examples of communication between an MTC device and an MTC application server include communication between a vending machine and a server, communication between a Point of Sale (POS) device and a server, and communication between an electricity meter, a gas meter or a water meter and a server. In addition, MTC-based applications may include, for example, security, transportation, and healthcare applications.

DISCLOSURE

Technical Problem

An object of the present invention devised to solve the problem lies in a method for accurately and efficiently performing group triggering on MTC devices.

It is to be understood that both the foregoing general description and the following detailed description of the present invention are exemplary and explanatory and are intended to provide further explanation of the invention as claimed.

Technical Solution

The object of the present invention can be achieved by providing a method for performing Machine Type Communication (MTC) group triggering by an MTC-InterWorking Function (IWF) in a wireless communication system, the method including transmitting a trigger request to a network node, wherein the network node to receive the trigger request is determined based on group trigger information including information indicating whether success or failure information of the trigger request should be transmitted on unit of MTC group.

In another aspect of the present invention, provided herein is a Machine Type Communication (MTC)-InterWorking Function (IWF) device for performing MTC group triggering in a wireless communication system, the MTC-IWF device including a transceiver module and a processor, wherein the processor is configured to transmit a trigger request to a network node, and wherein the network node to receive the trigger request is determined based on group trigger information including information indicating whether success or failure information of the trigger request should be transmitted on unit of MTC group.

The followings may be commonly applied to the method and the MTC-IWF device.

If the information indicating success or failure of the trigger request should be transmitted on unit of individual MTC device, the network node may be a network node associated with one of a T4 interface or a T5 interface.

If the network node is associated with the T5 interface, the network node may be at least one of a Mobile Switching Center (MSC), a Mobility Management Entity (MME) or a Serving GPRS (General Packet Radio Service) Support Node (SGSN).

If the network node is associated with the T4 interface, the network node may be a Short Message Service-Service Center (SMS-SC).

If the information indicating success or failure of the trigger request should be transmitted on unit of MTC group, the network node may be a Cell Broadcast Centre (CBC).

The group trigger information may further include a number of MTC devices belonging to an MTC group, mobility of the MTC devices belonging to the MTC group, and location information of the MTC devices belonging to the MTC group.

If the number of MTC devices is equal to or greater than a pre-configured value, the network node may be a CBC. If the number of MTC devices is less than the pre-configured value, the network node may be a network node associated with one of a T4 interface or a T5 interface.

If the MTC devices belonging to the MTC group are fixed type, the network node may be a CBC. If the MTC devices belonging to the MTC group have mobility, the network node may be a network node associated with one of a T4 interface or a T5 interface.

If locations of the MTC devices belonging to the MTC group are within a pre-configured region, the network node may be a CBC.

The method may further include receiving the group trigger information from a Home Subscriber Server (HSS), and the group trigger information may include subscriber information of the MTC devices belonging to the MTC group.

The subscriber information may be about MTC devices filtered based on filtering information including an attach status, a roaming status, a type of camped-on Radio Access Technology (RAT), a type of serving node, a number of serving nodes and location information of the MTC devices.

The filtering may be performed by comparing MTC device information based on one of information stored in the HSS or the subscriber information, to the filtering information.

The method may further include receiving a trigger request message from a Service Capability Server (SCS), and the trigger request message may include information associated with identification of an MTC group.

Advantageous Effects

According to the present invention, group-based MTC services may be efficiently provided.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
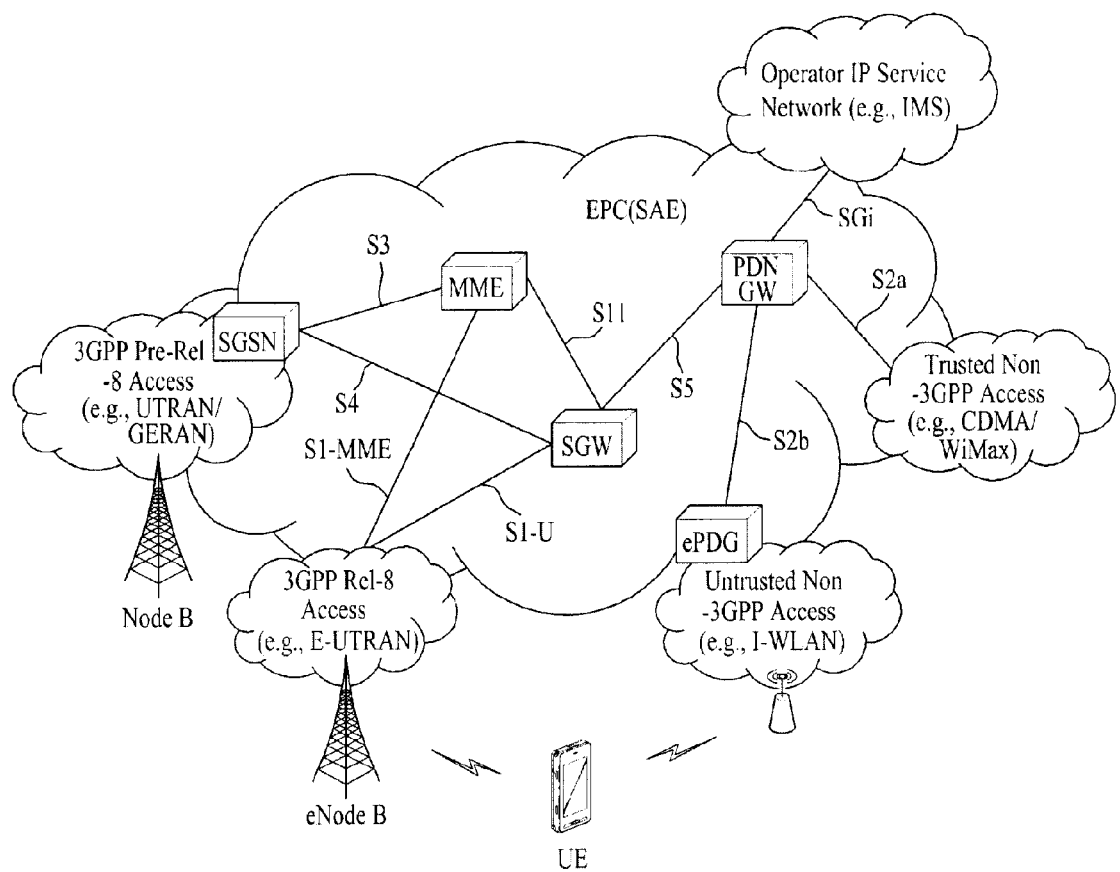
FIG. 1 is a view schematically illustrating the architecture of an Evolved Packet System (EPS)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems. For clarity, the present disclosure focuses on the 3GPP LTE and LTE-A systems. However, the technical features of the present invention are not limited thereto.

Terms used in the following description are defined as follows.

UMTS (Universal Mobile Telecommunication System): $3^{rd}$ generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE/UMTS Terrestrial Radio Access Network (UTRAN), which is evolved from UMTS.

NodeB: Base station of a UMTS network, which is installed outdoors and has a coverage corresponding to a macro cell.

eNB (eNodeB): Base station of an EPS network, which is installed outdoors and has a coverage corresponding to a macro cell.

UE (User equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device. The term "UE", as used in relation to MTC, can refer to an MTC UE.

IMS (IP Multimedia Subsystem): Subsystem for providing multimedia services based on IP.

IMSI (International Mobile Subscriber Identity): Globally unique user identifier assigned in a mobile communication network.

MTC (Machine Type Communication): Communication performed by a machine(s) without user intervention. MTC can also be referred to as Machine-to-Machine (M2M) communication.

MTC UE (or MTC device): UE (e.g., vending machine or meter) which has a communication function through a mobile communication network and serves a specific purpose.

MTC server: Server for managing MTC UEs on a network. The MTC server can be located inside or outside a mobile communication network, and can have an interface accessible by an MTC user. In addition, the MTC server can provide MTC-related services to other servers (e.g., Service Capability Server (SCS)), and can serve as an MTC application server.

MTC application: Service to which MTC is applied (e.g., remote metering, product movement tracking or meteorological sensing).

MTC application server: Server for executing an MTC application on a network.

MTC feature: Function of a network for supporting an MTC application. For example, MTC monitoring is a feature for preparing for equipment loss in an MTC application such as remote metering, and low mobility is a feature for an MTC application for an MTC UE such as a vending machine.

MTC subscriber: Entity connected to a network operator to provide services to one or more MTC UEs.

MTC group: Group of MTC UEs sharing one or more MTC features and belonging to an MTC subscriber.

SCS (Service Capability Server): Entity connected to a 3GPP network for communication with MTC UEs using an MTC-InterWorking Function (IWF) on a Home Public Land Mobile Network (HPLMN).

External Identifier: Globally unique identifier used to indicate (or identify) an MTC UE (or a subscriber to which the MTC UE belongs) by an external entity (e.g., SCS or Application Server) of the 3GPP network. The external identifier includes a domain identifier and a local identifier described below.

Domain Identifier: Identifier for identifying a domain controlled by an operator of a mobile communication network. One operator can use different domain identifiers for different services to provide access to the services.

Local Identifier: Identifier used to derive or acquire an International Mobile Subscriber Identity (IMSI). The local identifier should be unique within the application domain and is managed by an operator of a mobile communication network.

RAN (Radio Access Network): Unit including a NodeB, an eNodeB and a Radio Network Controller (RNC) for controlling the NodeB and the eNodeB in a 3GPP network, which is present between UEs and provides a connection to a core network.

HLR (Home Location Register)/HSS (Home Subscriber Server): Database having subscriber information in a 3GPP network. The HSS can perform functions such as configuration storage, identity management and user state storage.

RANAP (RAN Application Part): Interface between nodes (e.g., Mobility Management Entity (MME)/Serving GPRS (General Packet Radio Service) Support Node (SGSN)/Mobile Switching Center (MSC)) configured to control a RAN and a core network.

PLMN (Public Land Mobile Network): Network configured for the purpose of providing mobile communication services to individuals. This network can be configured per operator.

NAS (Non-Access Stratum): Functional layer for signaling and exchanging traffic messages between a UE and a core network in a UMTS protocol stack. Major functions thereof are to support UE mobility and to support a session management procedure for establishing and maintaining an IP connection between a UE and a PDN GW.

Hereinafter, a description will be given based on the above-defined terms.

FIG. 1 is a view schematically illustrating the architecture of an Evolved Packet System (EPS).

The EPC is a fundamental element of System Architecture Evolution (SAE) for improving the performance of 3GPP technologies. SAE corresponds to a study item for determining a network architecture supporting mobility between various types of networks. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In the legacy mobile communication system (i.e., $2^{nd}$ Generation (2G) or $3^{rd}$ Generation (3G) mobile communication system), the function of a core network is implemented through two distinct sub-domains, e.g., a Circuit-Switched (CS) sub-domain for voice and a Packet-Switched (PS) sub-domain for data. In a 3GPP LTE system evolved from the 3G communication system, the CS and PS sub-domains are unified into a single IP domain. That is, in the 3GPP LTE system, a connection between UEs having IP capability can be established through an IP-based base station (e.g., evolved NodeB (eNodeB)), an EPC and an application domain (e.g., IMS). That is, the EPC is an architecture inevitably required to implement end-to-end IP services.

The EPC may include various components. FIG. 1 illustrates some of the components, e.g., Serving Gateway (SGW), Packet Data Network Gateway (PDN GW), Mobility Management Entity (MME), Serving GPRS (General Packet Radio Service) Supporting Node (SGSN) and enhanced Packet Data Gateway (ePDG).

The SGW operates as a boundary point between a Radio Access Network (RAN) and a core network and is an element functioning to maintain a data path between an eNodeB and a PDN GW. In addition, if a UE moves over a region served by an eNodeB, the SGW serves as a local mobility anchor point. That is, packets may be routed through the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility with another 3GPP network (a RAN defined before 3GPP Release-8, e.g., UTRAN or GSM (Global System for Mobile Communication)/EDGE (Enhanced Data rates for Global Evolution) Radio Access Network (GERAN).

The PDN GW corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) network or WiMax network).

Although the SGW and the PDN GW are configured as separate gateways in the network architecture of FIG. 1, the two gateways may be implemented according to a single gateway configuration option.

The MME performs signaling and control functions for supporting access for a network connection of a UE, allocation of network resources, tracking, paging, roaming and handover. The MME controls control plane functions related to subscriber and session management. The MME manages a large number of eNodeBs and performs signaling for selection of a conventional gateway for handover to another 2G/3G network. In addition, the MME performs security procedures, terminal-to-network session handling, idle terminal location management, etc.

The SGSN handles all packet data for mobility management of a user to another 3GPP network (e.g., GPRS network) and authentication of the user.

The ePDG serves as a security node for an untrusted non-3GPP network (e.g., I-WLAN or Wi-Fi hotspot).

As described above in relation to FIG. 1, a UE having IP capabilities may access an IP service network (e.g., IMS) provided by an operator via various elements in the EPC based on not only 3GPP access but also non-3GPP access.

FIG. 1 illustrates various reference points (e.g., S1-U and S1-MME). In the 3GPP system, a conceptual link for connecting two functions, which are present in different functional entities of E-UTRAN and EPC, is defined as a reference point. Table 1 shows the reference points illustrated in FIG. 1. Various reference points other than those of Table 1 may also be present according to the network architecture.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing related control and mobility support between the trusted non-3GPP access and the PDNGW to a user plane. S2b is a reference point for providing related control and mobility support between the ePDG and the PDN GW to the user plane.

Figure 2:
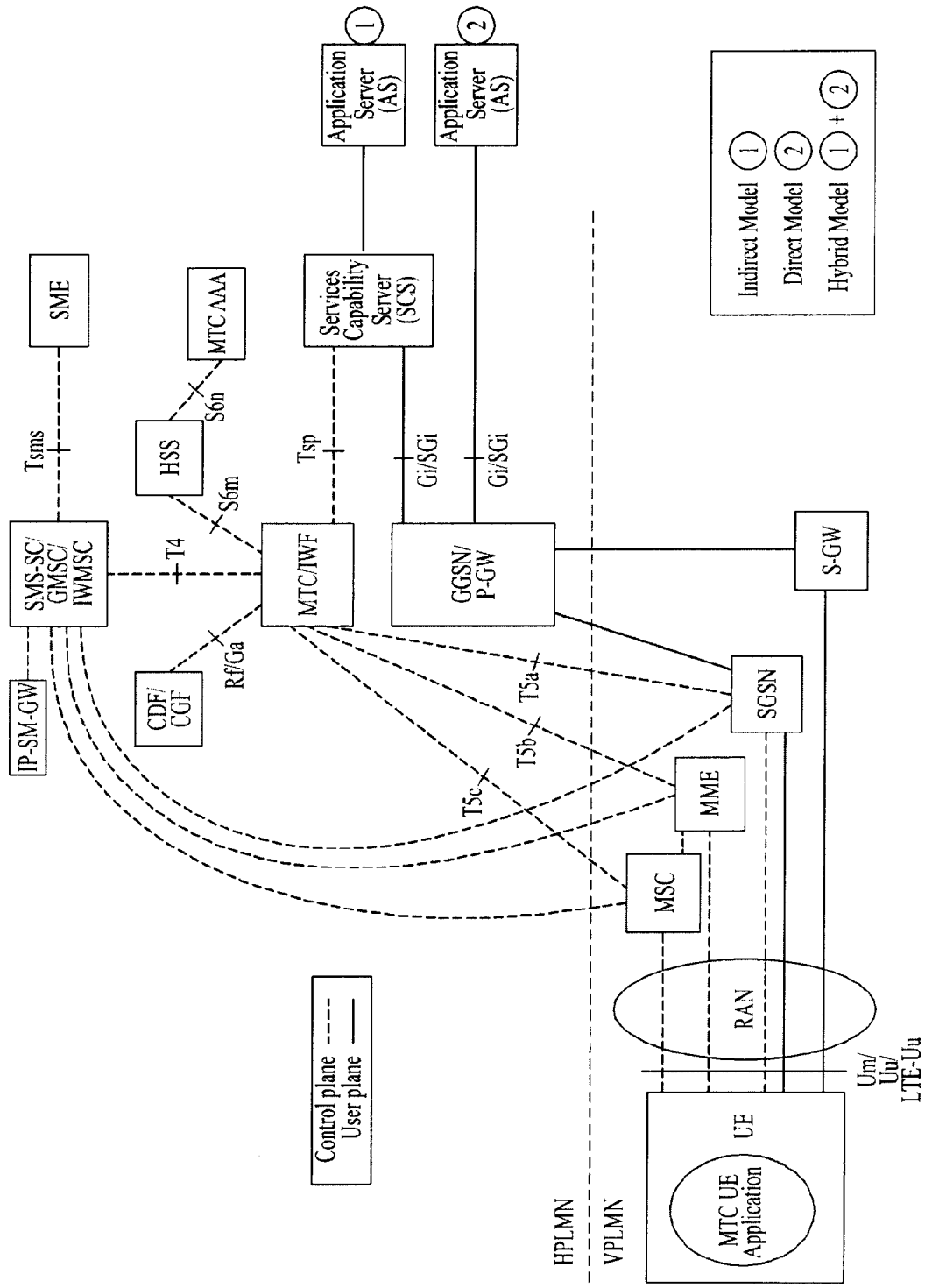
FIG. 2 is a view illustrating an exemplary model of a Machine Type Communication (MTC) architecture.

FIG. 2 is a view illustrating an exemplary model of an MTC architecture.

An end-to-end application between a UE (or an MTC UE) used for MTC and an MTC application may use services provided by a 3GPP system and selective services provided by an MTC server. The 3GPP system may provide transport and communication services (including 3GPP bearer service, IMS and SMS) including a variety of optimization services for facilitating MTC. In FIG. 2, the UE used for MTC is connected to a 3GPP network (e.g., UTRAN, E-UTRAN, GERAN or I-WLAN) through a Um/Uu/LTE-Uu interface. The architecture of FIG. 2 includes various MTC models (e.g., direct model, indirect model and hybrid model).

A description is now given of entities illustrated in FIG. 2.

In FIG. 2, an application server is a server for executing an MTC application on a network. The above-described various technologies for implementing MTC applications are applicable to an MTC application server and a detailed description thereof is omitted here. In addition, the MTC application server may access an MTC server through a reference point API and a detailed description thereof is omitted here. Alternatively, the MTC application server may be co-located with the MTC server.

An MTC server (e.g., SCS server in FIG. 2) is a server for managing MTC UEs on a network and may be connected to the 3GPP network to communicate with the UE used for MTC and nodes of PLMN.

An MTC-InterWorking Function (IWF) may control interworking between an MTC server and a core network of an operator and serve as a proxy for MTC operation. To support an MTC indirect or hybrid model, one or more MTC-IWFs may be present within a Home PLMN (HPLMN). The MTC-IWF may relay and analyze a signaling protocol on a reference point Tsp to operate a specific function in the PLMN.

The MTC-IWF may perform a function for authenticating the MTC server before the MTC server establishes communication with the 3GPP network, a function for authenticating a control plane request from the MTC server, various functions related to trigger instructions to be described below, etc.

A Short Message Service-Service Center (SMS-SC)/Internet Protocol Short Message GateWay (IP-SM-GW) may manage transmission and reception of an SMS. The SMS-SC may serve to relay a short message between a Short Message Entity (SME) (i.e., an entity for transmitting or receiving a short message) and a mobile station and to store and deliver the short message. The IP-SM-GW may serve to perform protocol interworking between the UE and the SMS-SC based on IP.

A Charging Data Function (CDF)/Charging Gateway Function (CGF) may perform operations related to charging.

An HLR/HSS may serve to store and provide subscriber information (e.g., IMSI), routing information, configuration information, etc. to the MTC-IWF.

An MSC/SGSN/MME may perform control functions such as mobility management, authentication and resource allocation for a network connection of a UE. The MSC/SGSN/MME may receive a trigger instruction from the MTC-IWF in relation to triggering to be described below, and process the trigger instruction into the form of a message to be provided to the MTC UE.

A Gateway GPRS Support Node (GGSN)/Serving-Gateway (S-GW)+Packet Data Network-Gateway (P-GW) may serve as a gateway for connecting a core network and an external network.

Table 2 shows major reference points illustrated in FIG. 2.

TABLE 2

| Reference Point | Description |
| --- | --- |
| Tsms | It is the reference point an entity outside the 3GPP system uses to communicate with UEs used for MTC via SMS. |
| Tsp | It is the reference point an entity outside the 3GPP system uses to communicate with the MTC-IWF related control plane signalling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| T5c | Reference point used between MTC-IWF and serving MSC. |
| S6m | Reference point used by MTC-IWF to interrogate HSS/HLR for E.164 MSISDN or external identifier mapping to IMSI and gather UE reachability and configuration information. |

One or more reference points among T5a, T5b and T5c are referred to as T5.

User plane communication with an MTC server in case of the indirect and hybrid models, and communication with an MTC application server in case of the direct and hybrid models may be performed using a legacy protocol through reference points Gi and SGi.

The descriptions given above in relation to FIG. 2 can be incorporated by reference in this specification by referring to 3GPP TS 23.682.

In the case of MTC, more MTC UEs than normal UEs are expected to be present on a network. Accordingly, MTC is required to minimize use of network resources, signaling and power.

In addition, an MTC UE may not establish an IP connection to an MTC application server at ordinary times to minimize use of system resources. If the MTC UE does not establish an IP connection and thus the MTC application server fails to transmit data to the MTC UE, the MTC UE may be requested or instructed to establish an IP connection and this request or instruction is referred to as a trigger instruction. That is, triggering of the MTC UE is required if an IP address of the MTC UE is unavailable or unreachable by the MTC application server (a fact that a certain entity or an address of the entity is unreachable means that an attempt for message delivery fails because, for example, the entity is absent from the address). To this end, the MTC UE may receive a trigger instruction from the network. Upon receiving the trigger instruction, the MTC UE is required to perform operation of an MTC application embedded therein and/or to establish communication with the MTC application server. Here, when the MTC UE receives the trigger instruction, a) a case in which the MTC UE is offline (i.e., not attached to the network), b) a case in which the MTC UE is online (i.e., attached to the network) but a data connection is not established, or c) a case in which the MTC UE is online (i.e., attached to the network) and a data connection is established, may be assumed.

For example, when an IP connection (or PDN connection) through which the MTC UE can receive data from the MTC application server is not established (or when the MTC UE can receive basic control signals but cannot receive user data), triggering of the MTC UE may be an operation for allowing the MTC UE to perform operation of an MTC application embedded therein and/or to request the MTC application server for an IP connection using a trigger message. In addition, the trigger message may include information for allowing the network to route a message to an appropriate MTC UE and allowing the MTC UE to route the message to an appropriate application of the MTC UE (hereinafter referred to as trigger information).

Figure 3:
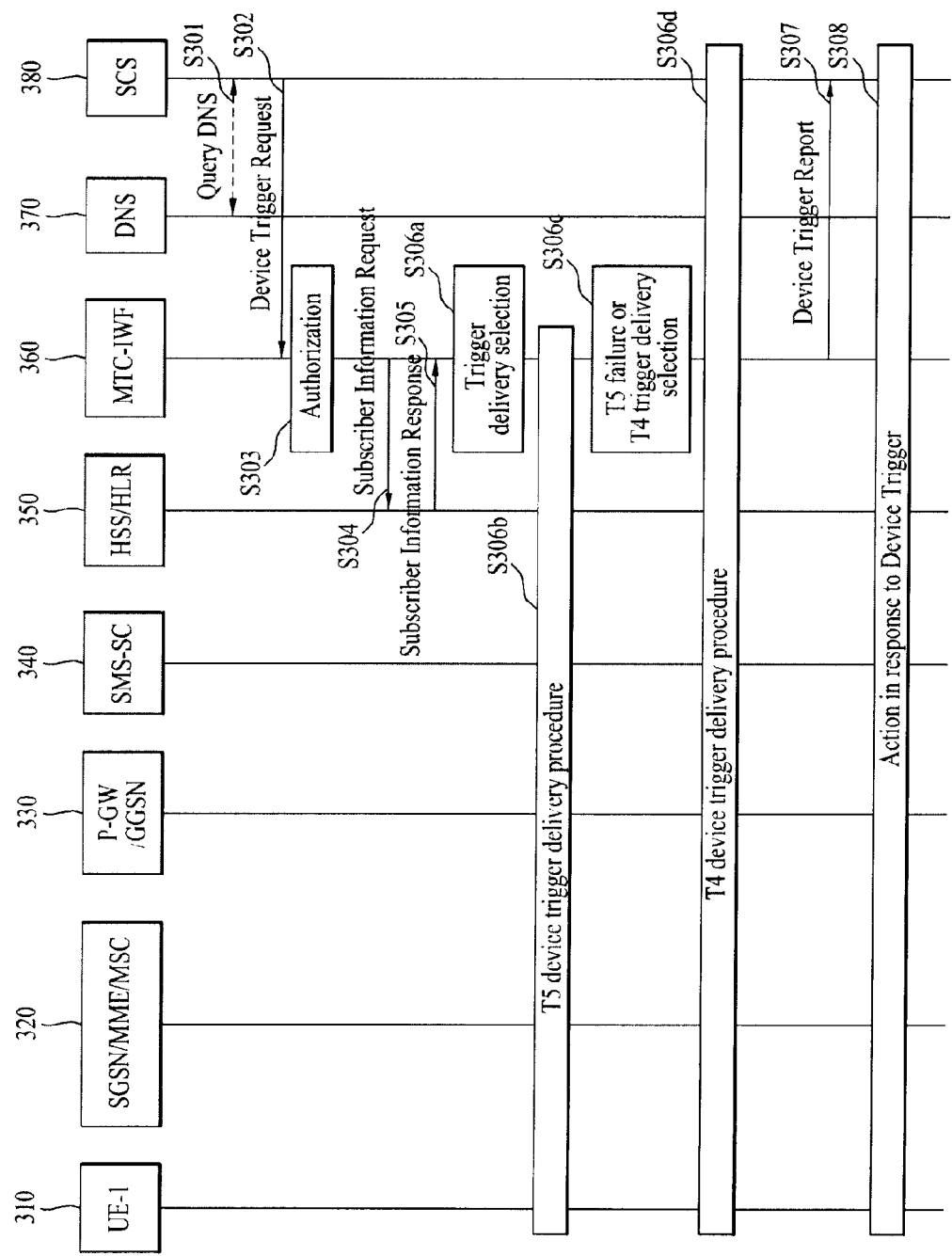
FIG. 3 is a view for describing an MTC trigger procedure.

A detailed description is now given of an MTC trigger procedure with reference to FIG. 3.

An SCS 380 may determine to trigger an MTC UE (S301). If there is no information about an MTC-IWF to which the SCS 380 is connected for a trigger request, the SCS 380 may determine an IP address and a port number of the MTC-IWF by sending a DNS query to a DNS 370 using an external identifier of the MTC UE to be triggered or an identifier of the MTC-IWF configured in the SCS 380. After that, the SCS 380 transmits a device trigger request message to an MTC-IWF 360 (S302). The device trigger request message may include information shown in Table 3.

TABLE 3 i) External Identifier or MSISDN: Identification of MTC UE to be triggered (or subscriber to which MTC UE belongs).
ii) SCS Identifier: Identifier of SCS having transmitted the device trigger request message.
iii) Trigger Reference Number: Reference number of the transmitted device trigger request message.
iv) Validity Period: Time period in which the device trigger request is valid. When the trigger request is not transmitted to MTC UE, the validity period indicates a period of time for which a network entity (e.g., MTC-IWF) should store the device trigger request.
v) Priority: Delivery priority of the device trigger request.
vi) Trigger Payload: Information to be transmitted to MTC application of MTC UE.

The MTC-IWF 360 having received the device trigger request message from the SCS 380 authenticates whether the SCS 380 is allowed to transmit the trigger request to a 3GPP network (S303). If authentication of the SCS 380 fails, the MTC-IWF 360 transmits a device trigger confirm message indicating failure of the device trigger request to the SCS 380. On the other hand, if authentication of the SCS 380 succeeds, the MTC-IWF 360 may perform a subsequent step.

The MTC-IWF 360 transmits a subscriber information request message to an HSS/HLR 350 (S304) in order to check whether the SCS 380 is allowed to trigger the MTC UE, to acquire IMSI using the identifier of the MTC UE (e.g., external identifier or MSISDN) which is received in step S302, and to acquire routing information including identifiers of serving nodes for serving the MTC UE.

The HSS/HLR 350 checks whether the SCS 380 having transmitted the device trigger request message is allowed to trigger the MTC UE (S305). After that, the HSS/HLR 350 transmits a subscriber information response message to the MTC-IWF 360, the message including IMSI and identifiers of serving nodes for serving the MTC UE. If the SCS 380 is not allowed to trigger the MTC UE, or if valid subscription information of the MTC UE is not present in the HSS/HLR 350, the HSS/HLR 350 transmits a subscriber information response message indicating this to the MTC-IWF 360. In this case, the MTC-IWF 360 transmits the device trigger confirm message indicating failure of the device trigger request to the SCS 380 and does not perform a subsequent step.

The MTC-IWF 360 selects a trigger delivery procedure based on the information received from the HSS/HLR 350 and local policy (S306a).

If a delivery procedure using T5 is selected, the MTC-IWF 360 performs a T5 trigger delivery procedure (S306b). A detailed description of the T5 trigger delivery procedure will be given below with reference to FIG. 4. If a delivery procedure using T4 is selected in step S306a or if T5 delivery fails in step S306b, the MTC-IWF 360 performs a T4 trigger delivery procedure (S306c and S306d). A detailed description of the T4 trigger delivery procedure will be given below with reference to FIG. 5.

The MTC-IWF 360 transmits a device trigger report message to the SCS 380 in response to the device trigger request message of S302 (S307). The device trigger report message indicates success or failure of trigger delivery to an MTC UE as a result of device trigger requested by the SCS 380.

A UE-1 310 performs an operation based on data of a trigger payload in response to the received device trigger (S308). This operation may typically include initiation of communication with the SCS 380 or an Application Server (AS).

Figure 4:
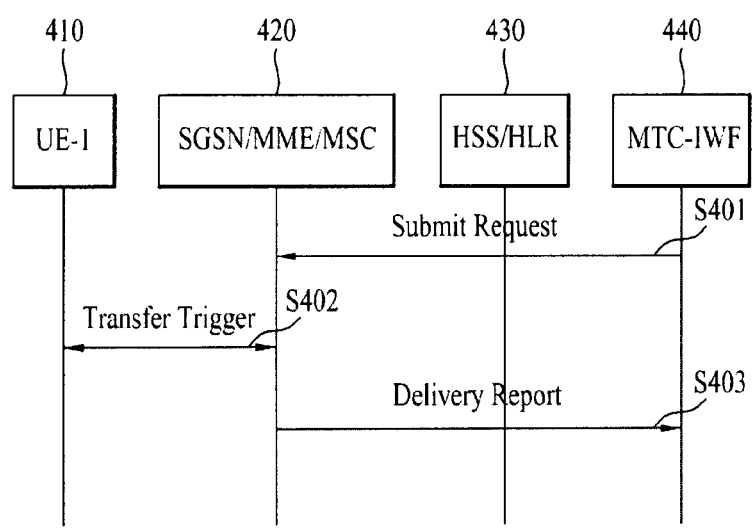
FIG. 4 is a view for describing a trigger procedure using T5.

FIG. 4 is a view for describing a T5 trigger delivery procedure. When the MTC-IWF receives a device trigger request from the SCS in step S302 of FIG. 3, the MTC-IWF selects an appropriate trigger delivery procedure based on information received from the HSS/HLR and local policy (S304 to S306a of FIG. 3). As a result, the MTC-IWF may transmit the device trigger request to SGSN through a T5a interface, to MME through a T5b interface, or to MSC through a T5c interface (the device trigger through the T5a, T5b or T5c interface may be referred to as T5 device trigger). Alternatively, the MTC-IWF may transmit the device trigger request to SMC-SC through a T4 interface. For example, referring to FIG. 4, if a plurality of serving nodes is available based on information acquired from an HSS/HLR 430, an MTC-IWF 440 selects an appropriate serving node 420. The MTC-IWF 440 transmits a submit request message to the selected serving node 420 (S401). As described above, the MTC-IWF 440 transmits the submit request message through the T5a interface if the selected serving node is the SGSN, through the T5b interface if the selected serving node is the MME, or through the T5c interface if the selected serving node is the MSC.

The serving node 420 having received the submit request message transmits a trigger message to a UE-1 410 which is a target UE of the device trigger (S402). The serving node 420 having performed the trigger operation transmits a delivery report message to the MTC-IWF 440. The above delivery report message may indicate success or failure of trigger delivery to an MTC UE as a result of device trigger requested by the MTC-IWF 440.

Figure 5:
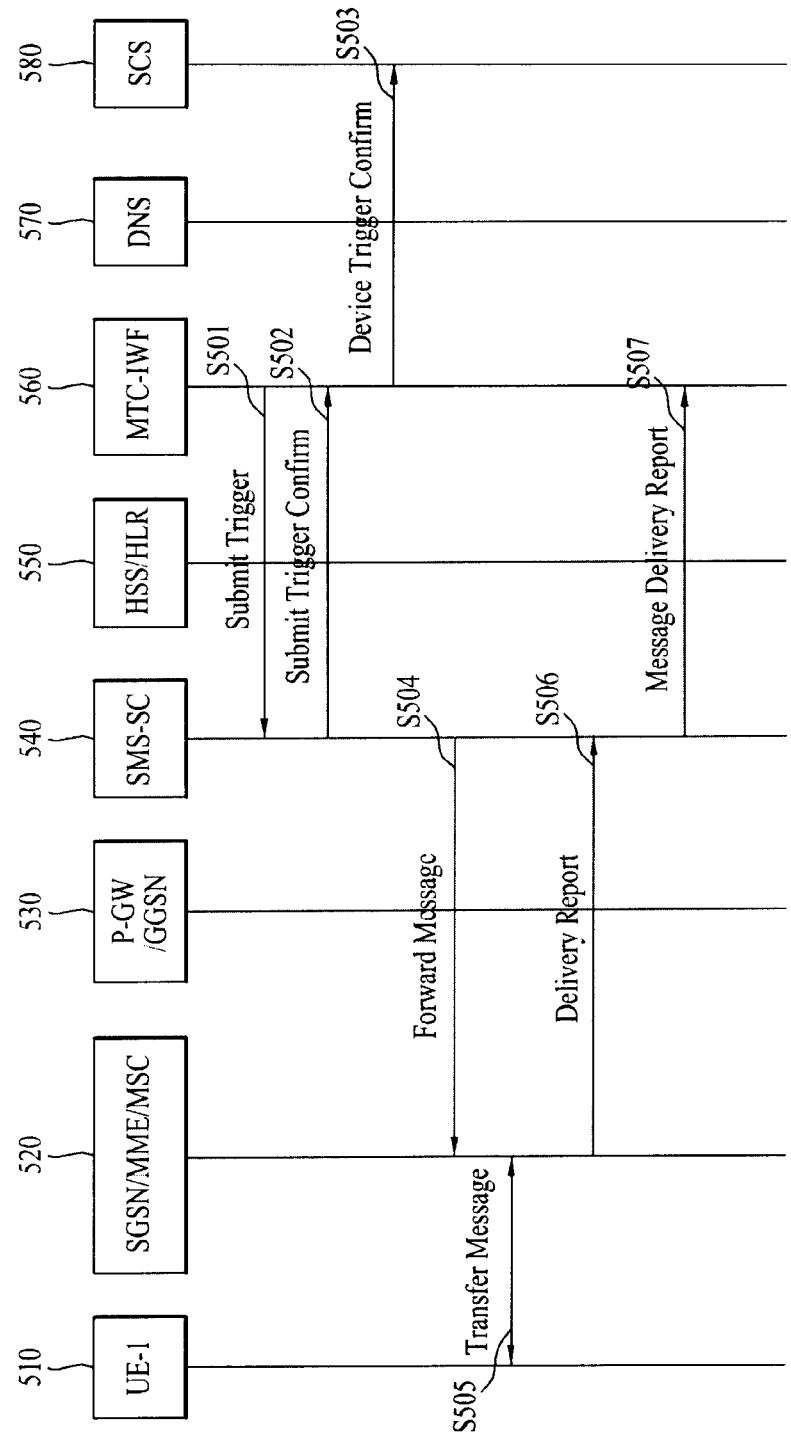
FIG. 5 is a view for describing a trigger procedure using T4.

FIG. 5 is a view for describing a T4 trigger delivery procedure. Referring to FIG. 5, an MTC-IWF 560 transmits a submit trigger message to an SMS-SC 540 based on information included in a device trigger request message received from an SCS 580 and information included in a subscriber information response message received from an HSS/HLR 550 (S501). The SMS-SC 540 transmits a submit trigger confirm message for responding that the submit trigger message is accepted, to the MTC-IWF 560 (S502). The MTC-IWF 560 having received the submit trigger confirm message from the SMS-SC 540 transmits a device trigger confirm message indicating that the device trigger request message transmitted from the SCS 580 is accepted, to the SCS 580 (S503).

A short message including the device trigger message transmitted from the SMS-SC 540 is forwarded to a serving node 520 (S504). In this case, if the received device trigger message includes routing information (information about the serving node 520), the SMS-SC 540 does not need to interrogate the HSS/HLR 550 to acquire the routing information. To be prepared for transmission failure of the short message, the SMS-SC 540 may store necessary information other than the routing information from among information received from the MTC-IWF 560.

Then, the serving node 520 transfers the short message to a UE-1 510 (S505). The UE-1 510 having received the short message including the device trigger message may respond to the serving node 520. The serving node 520 transmits a delivery report message to the SMS-SC 540 (S506). The delivery report message may indicate success or failure of short message delivery to an MTC UE as a result of short message delivery requested by the SMS-SC 540. If short message delivery fails, the SMS-SC 540 may acquire routing information for delivering the short message to the UE-1 510 by interrogating the HSS/HLR 550, and then perform retransmission using the information stored in step S504. The SMS-SC 540 transmits a message delivery report message to the MTC-IWF 560 to report success or failure of trigger delivery to an MTC UE as a result of device trigger requested by the MTC-IWF 560 (S507).

As described above, conventional MTC triggering using a T4 interface and a T5 interface (a T5a, T5b or T5c interface) is defined for an individual MTC UE but not for MTC group triggering. However, a Cell Broadcast Service (CBS) scheme is present in relation to MTC group triggering. A description is now given of the CBS scheme. When an SCS transmits a trigger request message including an identifier of an MTC group to which a trigger message is to be transmitted, geographic information, group trigger message information, etc. to an MTC-IWF, the MTC-IWF requests triggering to a Cell Broadcast Centre (CBC) and the CBC transmits a trigger message to MTC UEs belonging to the MTC group through cell broadcast on a cell basis or a Tracking Area (TA) basis.

This CBS scheme may be inappropriate when MTC devices included in a group move frequently or are distributed over a broad region instead of being gathered within a specific region. In addition, the CBS scheme may also be inappropriate when an SCS having requested group triggering needs to know success or failure of trigger message transmission for each of the MTC devices. For example, MTC devices for measuring water levels, which are located at regions where flooding is suspected or predicted, may be triggered to report currently measured water levels to an MTC application server. In this case, since reports from all MTC devices belonging to a target group to be triggered are important, an SCS needs to check success or failure of triggering of each MTC device.

Accordingly, a description is now given of an MTC group trigger method using a T4 or T5 interface, and a method for determining a trigger mechanism between the above MTC group trigger method using a T4 or T5 interface, and an MTC group trigger method using a CBS scheme. The following description is given in the order of determination of an MTC group trigger mechanism, MTC group trigger information associated with determination of an MTC group trigger mechanism, outline of an MTC group trigger procedure, an MTC group trigger procedure associated with a T5 interface, and an MTC group trigger procedure associated with a T4 interface. In the following description, the MTC group trigger information includes MTC group trigger mechanism determination/selection information and information necessary for MTC group triggering (e.g., subscriber information (IMSI information, serving node information, etc.) of MTC devices belonging to an MTC group to be triggered.

Determination of MTC Group Trigger Mechanism and Trigger Mechanism Selection Information Determination of an MTC group trigger mechanism according to an embodiment of the present invention may be performed by an MTC-IWF. Here, the trigger mechanism refers to MTC group triggering using a T4 interface and/or a procedure therefor, MTC group triggering using a T5 interface and/or a procedure therefor, or MTC group triggering using a CBS scheme and/or a procedure therefor. In addition, determination of the trigger mechanism may be regarded as transmission of an MTC group trigger request from the MTC-IWF to a specific network node. Specifically, determination of the T5 interface as the MTC group trigger mechanism by the MTC-IWF may mean that the specific network node may include one or more of an MSC, an MME and an SGSN. Further, determination of the T4 interface as the MTC group trigger mechanism by the MTC-IWF may mean that a network node for receiving an MTC group trigger request is an SMS-SC. Likewise, selection of the CBS scheme as the MTC group trigger mechanism may mean that a network node for receiving an MTC group trigger request is a CBC.

Determination of an MTC group trigger mechanism by the MTC-IWF may be performed based on MTC group trigger information and, more particularly, based on MTC group trigger mechanism determination/selection information. The MTC group trigger mechanism determination/selection information may include information described below.

i) Number of MTC devices belonging to MTC group.

ii) Features of MTC devices belonging to MTC group (whether MTC devices are fixed type (or whether MTC devices have mobility)), types (e.g., MSC, SGSN and MME) and number of serving nodes of MTC devices, density of MTC devices (e.g., the number of MTC devices located within the coverage of one cell, one eNB or one serving node), and roaming status of MTC devices.

iii) Geographical locations of MTC devices belonging to MTC group (or region/location information to which a group trigger message is to be transmitted). Here, the geographical location may refer to dynamic location information according to the mobility of a UE, but may also be information for determining whether the UE is located in a certain region based on pre-configured information. Alternatively, the geographical location may be information based on roaming status.

iv) Radio Access Technology (RAT) information to which a group trigger message is to be transmitted, e.g., GERAN, UTRAN, E-UTRAN or WLAN.

v) QoS level to be provided to MTC group.

vi) Operator policy.

vii) User preference.

viii) Priority and delivery level of trigger request message.

ix) Congestion status of RAN x) Congestion status of core network xi) Congestion status of interface used for group triggering (between CBC and MTC-IWF, T5a, T5b, T5c, T4, etc.)

xii) Frequency of group trigger request xiii) Whether retransmission is required upon failure of transmitting group triggering to MTC devices xiv) Other specific temporal/spatial conditions and specific MTC group xv) Whether to provide trigger success/failure information to SCS on unit of MTC device (or whether to provide trigger success/failure information to SCS on unit of triggering group)

The above information may be configured in an MTC-IWF, included in a trigger request message to be transmitted from an SCS to the MTC-IWF by the SCS as in step S302 of FIG. 3, or acquired from an HSS or another node.

In relation to the above-described MTC group trigger mechanism determination/selection information, determination of an MTC group trigger mechanism by the MTC-IWF may be performed as described below.

First, if trigger success/failure information should be provided to the SCS on unit of MTC device, a T4 or T5 scheme may be selected as an MTC group trigger mechanism. If the trigger success/failure information should be provided to the SCS on unit of triggering group (i.e., upon a trigger request), a CBS scheme may be selected/determined as an MTC group trigger mechanism.

Second, if the number of MTC devices belonging to an MTC group is equal to or greater than a certain reference value (threshold), a CBS scheme may be selected/determined as an MTC group trigger scheme. Otherwise, a T5 or T4 scheme may be selected/determined as an MTC group trigger scheme.

Third, if MTC devices belonging to an MTC group are fixed type, a CBS scheme may be selected. Otherwise, i.e., if the MTC devices have mobility, a T5 or T4 scheme may be selected.

Fourth, if the locations of MTC devices belonging to an MTC group are restricted to a specific region, a CBS scheme may be selected. Otherwise, a T5 or T4 scheme may be selected.

Fifth, a mobile communication operator for providing MTC services prefers a T4 scheme, the T4 scheme may be selected as an MTC group trigger scheme.

Sixth, a user using MTC services prefers a CBS scheme, the CBS scheme may be selected.

MTC Group Trigger Information

The MTC-IWF may transmit a trigger information request message to the HSS to acquire the MTC group trigger information, i.e., MTC group trigger mechanism selection information and/or information necessary for MTC group triggering. In this case, the MTC-IWF includes information such as an identifier of an MTC group in the trigger information request message. The trigger information request message may be transmitted at a point of time when each of the above information is necessary, or all necessary information may be requested at one time using a single trigger information request message. Alternatively, various combinations of information may be requested at various points of time using various combinations of trigger information request messages.

For example, the MTC-IWF may acquire information necessary to select an MTC group trigger mechanism from the HSS by transmitting a trigger information request for the MTC group trigger mechanism selection information before selecting an MTC group trigger mechanism. Alternatively, after the MTC-IWF selects a group trigger mechanism, the MTC-IWF may transmit the trigger information request message to the HSS to acquire the information necessary for MTC group triggering. In addition, the MTC-IWF may use the information necessary for MTC group triggering acquired from the HSS, to select an MTC group trigger mechanism.

As described above, the information necessary for MTC group triggering may include subscriber information of MTC devices and the subscriber information may have been filtered as will be described below. Specifically, when the HSS receives a message requesting the information necessary for MTC group triggering from another node (e.g., MTC-IWF), the HSS transmits the subscriber information of MTC devices (e.g., IMSI information, serving node information, etc. of MTC devices belonging to an MTC group to be triggered) to the requesting node. When the HSS transmits the subscriber information of the MTC devices to the MTC-IWF, the HSS may transmit information about all MTC devices belonging to the MTC group or information about MTC devices filtered based on one or more filtering information described below.

i) Whether MTC device is attached.

ii) Whether MTC device is located in HPLMN (i.e., roaming status)

iii) Type of RAT camped on by MTC device (e.g., GERAN, UTRAN, E-UTRAN or WiFi)

iv) Types and number of serving nodes of MTC device (e.g., MSC, SGSN and MME)

v) Location of MTC device (applicable in various ranges, e.g., cell basis, location area basis, routing area basis, tracking area basis or serving node basis)

Filtering may be performed based on various combinations of the above filtering information. For example, the HSS may provide information about only MTC devices located in a HPLMN (i.e., not roamed) and camping on an E-UTRAN among target MTC devices of group triggering, to the MTC-IWF. The filtering information may be based on the policy configured in the HSS or may be included in an information request message transmitted from the MTC-IWF to the HSS. Alternatively, the HSS may ultimately perform filtering based on some filtering information configured in the HSS and some other filtering information received from the MTC-IWF.

In addition, state information of MTC devices to be compared to the filtering information may include information acquired due to location registration (e.g., attach, LAU, RAU or TAU) performed by the MTC devices, subscriber information, MTC group information stored in the HSS and/or information acquired from another node. For example, even when an MTC device is not attached, if the MTC device is fixed type to have the same serving node all the time or if the MTC device moves only within a fixed region and thus has a single serving node among serving nodes belonging to a specific set, the state information may be stored in the subscriber information or the MTC group information stored in the HSS.

As such, even when the MTC device is detached as well as attached, the HSS may provide information such as serving node information to the MTC-IWF.

In the above description related to the MTC group trigger information, the MTC-IWF may transmit the trigger information request message to the HSS and/or the HSS may provide the subscriber information (including filtering) before, after or when the MTC-IWF determines an MTC group trigger mechanism.

Outline of MTC Group Trigger Procedure

Figure 6:
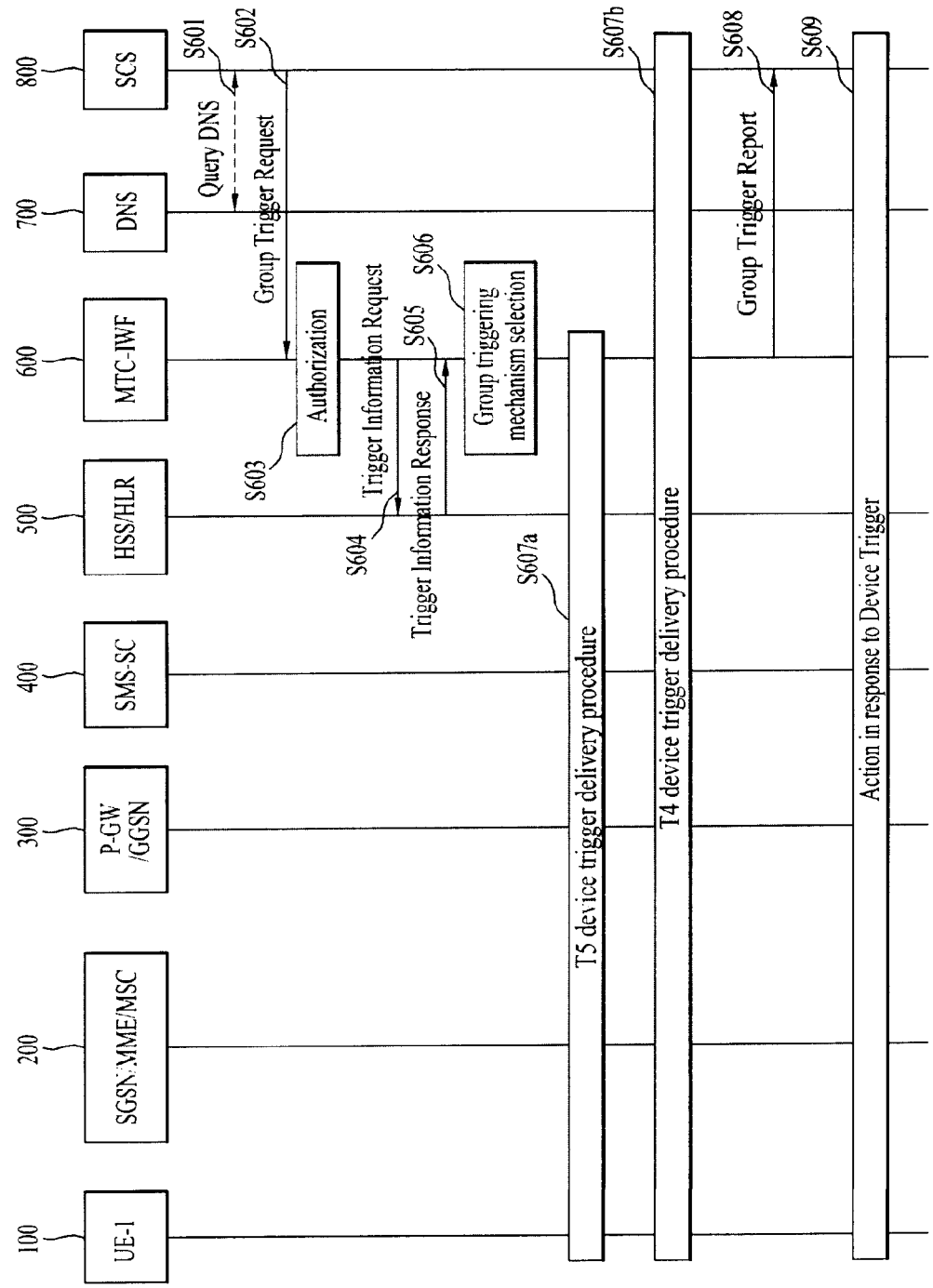
FIGS. 6 to 8 are views for describing an MTC group trigger procedure according to embodiments of the present invention.

A description is now given of an MTC group trigger procedure based on the above descriptions with reference to FIG. 6.

In step S601, an SCS 800 determines to request MTC group triggering. If there is no information about an MTC-IWF to which the SCS 800 is connected for a trigger request, the SCS 800 may determine an IP address and a port number of an MTC-IWF by sending a DNS query to a DNS 700 using an identifier of an MTC group to be triggered or an identifier of an MTC-IWF configured in the SCS 800.

In step S602, the SCS 800 transmits a group trigger request message to an MTC-IWF 600. The group trigger request message may include information described below.

i) MTC group identifier (i.e., identifier of MTC group to be triggered)

ii) SCS identifier (i.e., identifier of SCS having transmitted the group trigger request message)

iii) Trigger reference number (i.e., reference number of the transmitted group trigger request message)

iv) Validity period (i.e., lifetime of the group trigger request. When the trigger message is not transmitted to MTC UE, the validity period indicates a period of time for which a network entity (e.g., MTC-IWF) should store the trigger request.)

v) Priority (i.e., delivery priority of the group trigger request)

vi) Unit to provide trigger success/failure information (e.g., unit of MTC device)

vii) Trigger payload (i.e., information to be transmitted to MTC application of MTC UE)

In step S603, the MTC-IWF 600 having received the group trigger request message from the SCS 800 authenticates whether the SCS 800 is allowed to transmit the trigger request to a 3GPP network. If authentication of the SCS 800 fails, the MTC-IWF 600 transmits a group trigger confirm message indicating failure of the group trigger request to the SCS 800. On the other hand, if authentication of the SCS 800 succeeds, the MTC-IWF 600 performs a subsequent step S604.

In step S604, the MTC-IWF 600 transmits a trigger information request message to an HSS/HLR 500. The trigger information request message includes MTC group identifier information. A detailed description of this step has been given above in the 'MTC group trigger information' section, and thus is not redundantly given here.

In step S605, the HSS/HLR 500 transmits a trigger information response message including information requested by the MTC-IWF 600, to the MTC-IWF 600. A detailed description of this step has been given above in the 'MTC group trigger information' section, and thus is not redundantly given here.

If the SCS 800 is now allowed to request MTC group triggering, or if the HSS/HLR 500 has no valid information about the MTC group, the HSS/HLR 500 transmits a trigger information response message indicating this to the MTC-IWF 600. In this case, the MTC-IWF 600 transmits a group trigger confirm message indicating failure of the group trigger request to the SCS 800, and does not perform a subsequent step.

In step S606, the MTC-IWF 600 selects an MTC group trigger mechanism based on the information received from the HSS/HLR 500 and local policy. A detailed description of this step has been given above in the 'Determination of MTC group trigger mechanism and trigger mechanism selection information' section, and thus is not redundantly given here.

As an interface initially selected for triggering, the MTC-IWF 600 may use a T4 interface for all UEs to be triggered, use a T5 interface (i.e., T5a/T5b/T5c) for all UEs, or use the T4 interface for some UEs and use the T5 interface for the other UEs. However, the interface is not limited to the T4 or T5 interface.

Step S606 may also be performed before step S604.

According to the MTC group trigger mechanism determined in step S606, step S607a, or step S607b, a trigger procedure using a CBS scheme is performed.

If the T5 interface (at least one of T5a, T5b or T5c interfaces) is selected as one of MTC group trigger mechanisms, in step S607a, the MTC-IWF 600 triggers all UEs to be triggered using the T5 scheme.

If information indicating that the MTC-IWF 600 transmits a single trigger message to the same subsequent network node for MTC group triggering is configured in the HSS/HLR 500 or if the MTC-IWF 600 has transmitted such information to the HSS/HLR 500 in step S604, the HSS/HLR 500 may respond to the MTC-IWF 600 without including identifier information (e.g., IMSI) of all UEs belonging to the MTC group in step S605. Additionally, information such as the number of MTC UEs to be triggered may be included instead of identifier information of all UEs belonging to the MTC group in step S605. A detailed description of the MTC group trigger procedure using the T5 interface will be given below with reference to FIG. 7.

If the T4 interface is selected as one of MTC group trigger mechanisms, in step S607b, the MTC-IWF 600 triggers all UEs to be triggered using the T4 scheme. A detailed description of the MTC group trigger procedure using the T4 interface will be given below with reference to FIG. 8.

In step S608, the MTC-IWF 600 transmits a group trigger report message to the SCS 800 in response to the group trigger request message of step S602. The group trigger report message includes a result of group trigger requested by the SCS 800. The result of group triggering may include information indicating success or failure of trigger delivery on an MTC UE basis (e.g., include information about each failed MTC UE), or include only information indicating success or failure of a group trigger request (e.g., not include information indicating to which MTC UE trigger delivery fails). The group trigger report may also be transmitted irrespective of whether all MTC UEs to be group triggered have been successfully triggered.

In step S609, a UE-1 100 performs an operation based on data of a trigger payload in response to the received device trigger. This operation may typically include initiation of communication with the SCS 800 or an AS.

When the MTC group identifier is included in the message in the above MTC group trigger operation, additional information indicating that the identifier is not for an individual UE but for an MTC group may also be included in the message.

Meanwhile, the above-described MTC group trigger scheme using the T5 interface in step S607a and the MTC group trigger scheme using the T4 interface in step S607b may include a combination of one or more operations or configurations described below.

i) When the MTC-IWF performs group triggering using a T4 interface or a T5 interface, the MTC-IWF may transmit trigger messages to all MTC devices to be triggered through scheduling instead of transmitting the messages at one time. For example, the messages may be transmitted at regular intervals. This serves to prevent congestion caused when many devices are triggered simultaneously.

The MTC-IWF may transmit individual trigger messages for different MTC devices, or may include all information about MTC devices using the same interface in a single trigger message to be transmitted to the same subsequent node (e.g., SMS-SC in the case of T4, SGSN in the case of T5a, MME in the case of T5b, and MSC in the case of T5c). In the latter case, that is, when a single trigger message is transmitted, for example, if UE1, UE2 and UE3 can be triggered by SGSN-1, the MTC-IWF may include information necessary to trigger the three UEs in a single trigger message to be transmitted to the SGSN-1. The above information may include identifier information of all UEs to be triggered, or identifier information of an MTC group to be triggered, i.e., MTC group identifier information.

The MTC-IWF may determine whether to transmit individual trigger messages for different UEs or to transmit a single trigger message for the same subsequent node based on one or more among the number of MTC UEs belonging to an MTC group, the number of MTC UEs belonging to the MTC group and to be triggered, the number of serving nodes for serving the MTC UEs belonging to the MTC group, roaming status of the MTC UEs belonging to the MTC group, congestion status of a core network, and congestion status of RAN.

ii) When a serving node associated with T5 device triggering (e.g., MSC, SGSN or MME) or a node associated with device triggering using SMS, i.e., T4 device triggering (e.g., SMS-SC or SMS-GMSC) receives a device trigger request including an MTC group identifier from the MTC-IWF, the node may perform a trigger operation on MTC devices based on the MTC group identifier. The node may identify MTC devices belonging to an MTC group corresponding to the MTC group identifier based on information received from each UE (e.g., group information included by the UE in an attach, TAU, RAU or LAU procedure), subscriber information acquired from an HSS, and information acquired from a third MTC group management node.

The serving node may maintain/manage group context for managing MTC devices belonging to an MTC group served thereby, on unit of MTC group to efficiently manage and serve the MTC devices. This group context may include various information including list information of MTC devices belonging to the same group and served by the serving node.

iii) Since congestion can be caused when UEs belonging to the same MTC group simultaneously communicate with an SCS or an AS or respond to received trigger messages, the MTC-IWF or a network node requested by the MTC-IWF to transmit a trigger message, i.e., SMS-SC, SGSN, MME or MSC, may arbitrarily set a time for each MTC device to start communication or response to the received trigger message (e.g., 1 min. for UE1 and 2 min. for UE2) and may include the time information in the trigger message. Additionally, information indicating MTC group triggering may be explicitly/implicitly included. The MTC device having received the trigger message may communicate with the SCS or the AS using the time information or the information indicating MTC group triggering (i.e., based on arbitrarily generated or pre-configured communication/response start time information).

MTC Group Trigger Procedure—Associated with T5 Interface

Figure 7:
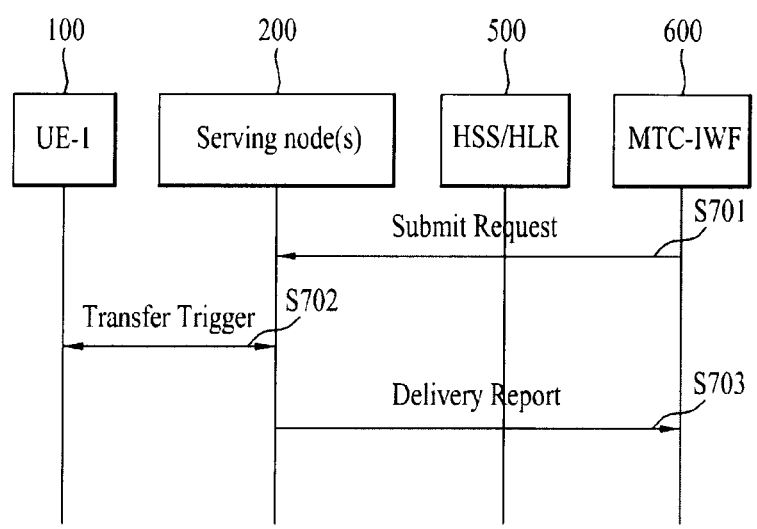

FIG. 7 illustrates an MTC group trigger procedure associated with a T5 interface. Referring to FIG. 7, in step S701, the MTC-IWF 600 transmits a submit request message to a corresponding serving node(s) 200 to trigger all MTC devices for which the T5 scheme is selected as an MTC group trigger mechanism. For example, if a trigger request should be transmitted to MME1, MME2, MME3, SGSN1 and SGSN2 to trigger all MTC devices for which the T5 scheme is selected, the MTC-IWF 600 transmits a submit request message to the 5 serving nodes. Here, the submit request message is transmitted through a T5a interface if the serving node is an SGSN, through a T5b interface if the serving node is an MME, and through a T5c interface if the serving node is an MSC.

The MTC-IWF 600 may completely or selectively include information included in a group trigger request message received from the SCS 800, in the submit request message without any change or in a processed form. Further, the MTC-IWF 600 may additionally include information acquired from the HSS/HLR 500 in the submit request message.

In step S702, the serving node 200 having received the submit request message transfers a trigger message to all target UEs served thereby and to be triggered on unit of group. The UE-1 100 having received the trigger message responds to the serving node 200 having transmitted the trigger message thereto.

In step S703, the serving node 200 having performed the trigger operation transmits a delivery report message to the MTC-IWF 600. The delivery report message includes a result of group trigger requested by the MTC-IWF 600. The result of group triggering may include information indicating success or failure of trigger delivery on an MTC UE basis (e.g., include information about each failed MTC UE), or include only information indicating success or failure of a group trigger request (e.g., not include information indicating to which MTC UE trigger delivery fails).

MTC Group Trigger Procedure—Associated with T4 Interface

Figure 8:
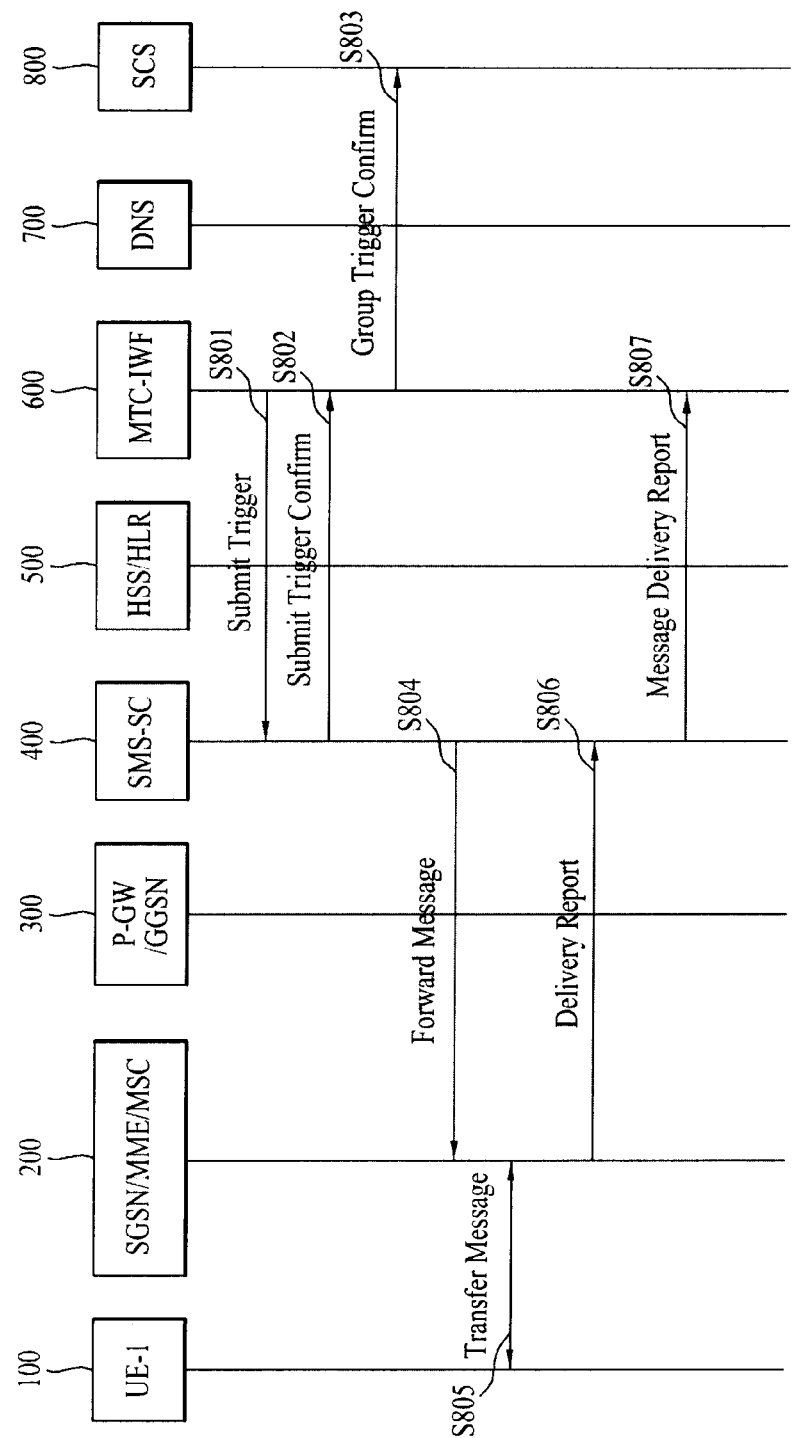

FIG. 8 illustrates an MTC group trigger procedure associated with a T4 interface. Referring to FIG. 8, in step S801, the MTC-IWF 600 transmits a submit trigger message to a corresponding SMS-SC(s) 400 to trigger all MTC devices for which the T4 scheme is selected as an MTC group trigger mechanism. For example, if a trigger request should be transmitted to SMS-SC1 and SMS-SC2 to trigger all MTC devices for which the T4 scheme is selected, the MTC-IWF 600 transmits a submit trigger message to the 2 SMS-SCs. The MTC-IWF 600 may completely or selectively include information included in a group trigger request message received from the SCS 800, in the submit trigger message without any change or in a processed form. Further, the MTC-IWF 600 may additionally include information acquired from the HSS/HLR 500 (e.g., ID of a serving node(s) of MTC devices) in the submit trigger message.

In step S802, the SMS-SC 400 transmits a submit trigger confirm message for responding that the submit trigger message is accepted, to the MTC-IWF 600.

In step S803, the MTC-IWF 600 having received the submit trigger confirm message from the SMS-SC 400 transmits a group trigger confirm message indicating that the group trigger request message transmitted from the SCS 800 in step S602 of FIG. 6 is accepted, to the SCS 800.

In step S804, the SMS-SC 400 forwards a short message including a device trigger message to a serving node 200. In this case, if the submit trigger message received in step S801 includes routing information (i.e., information about a serving node), the SMS-SC 400 does not need to interrogate the HSS/HLR 500 to acquire the routing information. To be prepared for transmission failure of the short message, the SMS-SC 400 stores necessary information other than the routing information from among the information received from the MTC-IWF 600 in step S801. When a single serving node serves a plurality of target devices to be triggered, the SMS-SC 400 may transmit only a single message (i.e., a short message including a device trigger message) to the serving node and include information about corresponding MTC devices (e.g., information about an MTC group or information about each MTC device) in the message. Alternatively, the SMS-SC 400 may transmit a short message including a device trigger message for each of corresponding MTC devices to the serving node.

In step S805, the serving node 200 having received the short message transfers the short message to all target UEs served thereby and to be triggered on unit of group. The UE-1 100 having received the short message including the device trigger message responds to the serving node 200 having transmitted the trigger message thereto.

In step S806, the serving node 200 having delivered the short message transmits a delivery report message to the SMS-SC 400. The delivery report message includes a result of short message delivery requested by the SMS-SC 400. The result of group triggering may include information indicating success or failure of trigger delivery on an MTC UE basis (e.g., include information about each failed MTC UE), or include only information indicating success or failure of a group trigger request (e.g., not include information indicating to which MTC UE trigger delivery fails).

In step S807, the SMS-SC 400 transmits a message delivery report message to the MTC-IWF 600 to report a result of group trigger requested by the MTC-IWF 600. The result of group triggering may include information indicating success or failure of trigger delivery on an MTC UE basis (e.g., include information about each failed MTC UE), or include only information indicating success or failure of a group trigger request (e.g., not include information indicating to which MTC UE trigger delivery fails).

Figure 9:
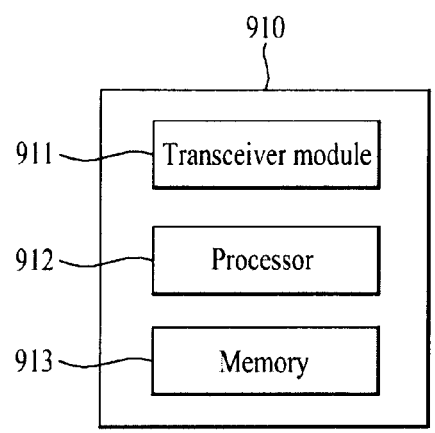
FIG. 9 is a block diagram of a device according to an embodiment of the present invention.

FIG. 9 is a block diagram of a device according to an embodiment of the present invention.

Referring to FIG. 9, an MTC-IWF device 910 according to an embodiment of the present invention may include a transceiver module 911, a processor 912 and a memory 913. The transceiver module 911 may be configured to transmit and receive a variety of signals, data and information to and from an external device (e.g., a network node (not shown) and/or a server device (not shown)). The processor 912 may be configured to provide overall control to the MTC-IWF device 910 and to process information to be transmitted to or received from the external device. The memory 913 may store the processed information for a predetermined time and is replaceable by another component such as a buffer (not shown).

The processor 912 of the MTC-IWF device 910 may perform processes required to implement the above-described embodiments.

The MTC-IWF device 910 may be configured in such a manner that the above-described embodiments of the present invention are implemented independently or two or more embodiments are combined. Redundant descriptions are not given here for clarity.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. performing the above-described functions or operations. Software code may be stored in a memory unit and executed by a processor. The memory unit may be located inside or outside the processor and exchange data with the processor via various known means.

The detailed descriptions of the preferred embodiments of the present invention have been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The above-mentioned embodiments of the present invention are applicable to a variety of mobile communication systems.

The invention claimed is:

1. A method for performing Machine Type Communication (MTC) group triggering by an MTC-InterWorking Function (IWF) in a wireless communication system, the method comprising:
   transmitting a trigger request to a network node,
      wherein the network node to receive the trigger request is determined based on group trigger information comprising information indicating whether success or failure information of the trigger request should be transmitted per MTC group, and
      wherein, if the information indicating success or failure of the trigger request should be transmitted per individual MTC device, the network node is associated with one of a T4 interface or a T5 interface.

2. The method according to claim 1, wherein, if the network node is associated with the T5 interface, the network node is at least one of a Mobile Switching Center (MSC), a Mobility Management Entity (MME) or a Serving GPRS (General Packet Radio Service) Support Node (SGSN).

3. The method according to claim 1, wherein, if the network node is associated with the T4 interface, the network node is a Short Message Service-Service Center (SMS-SC).

4. The method according to claim 1, wherein, if the information indicating success or failure of the trigger request should be transmitted mer MTC group, the network node is a Cell Broadcast Centre (CBC).

5. The method according to claim 1, wherein the group trigger information further comprises a number of MTC devices belonging to an MTC group, mobility of the MTC devices belonging to the MTC group, and location information of the MTC devices belonging to the MTC group.

6. The method according to claim 5, wherein, if the number of MTC devices is equal to or greater than a pre-configured value, the network node is a CBC, and
wherein, if the number of MTC devices is less than the pre-configured value, the network node is associated with one of the T4 interface or the T5 interface.

7. The method according to claim 5, wherein, if the MTC devices belonging to the MTC group are fixed type, the network node is a CBC, and
wherein, if the MTC devices belonging to the MTC group have mobility, the network node is associated with one of the T4 interface or the T5 interface.

8. The method according to claim 5, wherein, if locations of the MTC devices belonging to the MTC group are within a pre-configured region, the network node is a CBC.

9. The method according to claim 1, further comprising receiving the group trigger information from a Home Subscriber Server (HSS),
wherein the group trigger information comprises subscriber information of the MTC devices belonging to the MTC group.

10. The method according to claim 9, wherein the subscriber information is about MTC devices filtered based on filtering information comprising an attach status, a roaming status, a type of camped-on Radio Access Technology (RAT), a type of serving node, a number of serving nodes and location information of the MTC devices.

11. The method according to claim 10, wherein the filtering is performed by comparing MTC device information based on one of information stored in the HSS or the subscriber information, to the filtering information.

12. The method according to claim 1, further comprising receiving a trigger request message from a Service Capability Server (SCS),
wherein the trigger request message comprises information associated with identification of an MTC group.

13. A Machine Type Communication (MTC)-InterWorking Function (IWF) device for performing MTC group triggering in a wireless communication system, the MTC-IWF device comprising:
a transceiver module; and
a processor,
wherein the processor is configured to transmit a trigger request to a network node,
wherein the network node to receive the trigger request is determined based on group trigger information comprising information indicating whether success or failure information of the trigger request should be transmitted per MTC group, and
wherein, if the information indicating success or failure of the trigger request should be transmitted per individual MTC device, the network node is associated with one of a T4 interface or a T5 interface.

* * * * *